US011049624B2

United States Patent
Loewen et al.

(10) Patent No.: US 11,049,624 B2
(45) Date of Patent: Jun. 29, 2021

(54) NUCLEAR REACTOR LIQUID METAL COOLANT BACKFLOW CONTROL

(71) Applicants: Eric Paul Loewen, Wilmington, NC (US); Seth Ryan Paul Strege, Wilmington, NC (US); Nicholas Francis O'Neill, Alpharetta, GA (US); Colin Christopher O'Connor, Atlanta, GA (US); Chelsea Ann Curtin, Atlanta, GA (US); Edwin Wu, Houston, TX (US)

(72) Inventors: Eric Paul Loewen, Wilmington, NC (US); Seth Ryan Paul Strege, Wilmington, NC (US); Nicholas Francis O'Neill, Alpharetta, GA (US); Colin Christopher O'Connor, Atlanta, GA (US); Chelsea Ann Curtin, Atlanta, GA (US); Edwin Wu, Houston, TX (US)

(73) Assignee: GE-HITACHI NUCLEAR ENERGY AMERICAS LLC, Wilmington, NC (US)

( * ) Notice: Subject to any disclaimer, the term of this patent is extended or adjusted under 35 U.S.C. 154(b) by 1364 days.

(21) Appl. No.: 14/960,532

(22) Filed: Dec. 7, 2015

(65) Prior Publication Data

US 2017/0162283 A1 Jun. 8, 2017

(51) Int. Cl.
*G21C 15/247* (2006.01)
*F04B 17/00* (2006.01)
(Continued)

(52) U.S. Cl.
CPC ............ *G21C 15/247* (2013.01); *F04B 17/00* (2013.01); *H02K 44/06* (2013.01); *F04B 23/04* (2013.01); *H02K 44/02* (2013.01); *Y02E 30/30* (2013.01)

(58) Field of Classification Search
CPC ........ G21C 15/247; F04B 17/00; F04B 23/04; H02K 44/00; H02K 44/02; H02K 44/06
(Continued)

(56) References Cited

U.S. PATENT DOCUMENTS 2,658,452 A 11/1953 Donelian
2,686,474 A 8/1954 Pulley
(Continued)

FOREIGN PATENT DOCUMENTS

DE 2902898 A1 * 7/1979 ............... G21D 1/04
DE 3204462 C1 * 5/1983 ............. H02K 44/06
(Continued)

OTHER PUBLICATIONS

Toshiba. 4S Design Description. 75 page. May 2008. Available online: <https://www.nrc.gov/docs/ML0814/ML081440765.pdf>. (Year: 2008).*

(Continued)

*Primary Examiner* — Lily C Garner
(74) *Attorney, Agent, or Firm* — Harness, Dickey & Pierce, P.L.C.

(57) ABSTRACT

A liquid metal-cooled nuclear reactor includes, within a reactor pressure vessel, a primary electromagnetic pump (EMP) circulating liquid metal coolant through the reactor core and a backflow EMP. The nuclear reactor may be configured to at least partially mitigate liquid metal coolant backflow in response to a primary EMP failure. The backflow EMP is coupled in series with the primary EMP within the reactor pressure vessel. The backflow EMP may be selectively activated in response to failure of the primary EMP to mitigate liquid metal backflow through the primary EMP. The primary EMP and backflow EMP may receive power from separate power sources. Multiple backflow EMPs may be coupled in parallel to the primary EMP via (Continued)

parallel liquid metal coolant lines. A nuclear reactor may include multiple primary EMPs and multiple sets of backflow EMPs, where each separate set of backflow EMPs is coupled to a separate primary EMP.

9 Claims, 5 Drawing Sheets

(51) Int. Cl.
*H02K 44/06* (2006.01)
*F04B 23/04* (2006.01)
*H02K 44/02* (2006.01)

(58) Field of Classification Search
USPC .......................................................... 376/298
See application file for complete search history.

(56) References Cited

U.S. PATENT DOCUMENTS

| | | | |
|---|---|---|---|
| 2,716,943 A | 9/1955 | Vandenberg | |
| 2,808,002 A | 10/1957 | Erwin | |
| 3,030,888 A | 4/1962 | Keltz | |
| 3,187,672 A | 6/1965 | Baker | |
| 3,448,577 A * | 6/1969 | Crawford | B60K 17/10 60/420 |
| 3,656,867 A | 4/1972 | Carbonnel et al. | |
| 3,862,641 A | 1/1975 | Follett | |
| 3,951,738 A | 4/1976 | George et al. | |
| 4,765,948 A * | 8/1988 | DeLuca | G21C 15/247 310/11 |
| 4,802,531 A | 2/1989 | Nathenson et al. | |
| 4,842,170 A * | 6/1989 | Del Vecchio | B22D 39/003 222/594 |
| 4,865,123 A * | 9/1989 | Kawashima | H05K 7/20272 165/104.33 |
| 4,917,296 A * | 4/1990 | Konieczynski | B05B 12/006 239/1 |
| 5,118,461 A * | 6/1992 | Fujii | G21C 17/032 376/246 |
| 5,209,646 A | 5/1993 | Smither | |
| 6,416,859 B1 * | 7/2002 | Caswell | C08J 3/226 428/364 |
| 6,658,861 B1 * | 12/2003 | Ghoshal | F25B 21/02 62/3.7 |
| 7,010,393 B2 * | 3/2006 | Mirsky | F04D 15/0022 417/1 |
| 7,218,068 B2 * | 5/2007 | Fukuoka | F04B 49/02 318/157 |
| 8,684,031 B2 * | 4/2014 | Stones | C23C 16/54 137/565.23 |
| 9,093,182 B2 * | 7/2015 | Inatomi | G21C 15/247 |
| 9,397,544 B2 * | 7/2016 | Fujishima | H02K 7/125 |
| 2006/0073024 A1 * | 4/2006 | Ghoshal | H02P 25/032 417/50 |
| 2006/0107794 A1 * | 5/2006 | Loewen | C22B 9/02 75/406 |
| 2008/0123795 A1 * | 5/2008 | Hyde | G21C 1/026 376/244 |
| 2010/0258196 A1 * | 10/2010 | Melcer | F17D 1/14 137/2 |
| 2011/0222642 A1 * | 9/2011 | Gautier | G21C 1/02 376/395 |
| 2012/0099694 A1 * | 4/2012 | Inatomi | G21C 1/02 376/287 |
| 2016/0290674 A1 * | 10/2016 | Tateishi | F24F 11/83 |
| 2017/0162280 A1 | 6/2017 | Loewen et al. | |

FOREIGN PATENT DOCUMENTS

| | | | | |
|---|---|---|---|---|
| GB | 2104710 A | * | 3/1983 | ............... G21C 1/03 |
| JP | 5163830 B1 | * | 3/2013 | |
| JP | 2014095354 A | * | 5/2014 | |
| PL | 195819 B1 | * | 10/2007 | |

OTHER PUBLICATIONS

International Search Report and Written Opinion issued in connection with corresponding PCT Application No. PCT/US16/64112 dated Sep. 19, 2017.
Office Action dated Feb. 28, 2020 in Canadian Application No. 3,007,714.
Office Action dated May 14, 2020, issued in corresponding European Patent Application No. 16874106.4.
Office Action dated Mar. 21, 2019 in corresponding Canadian Application No. 3,007,714.
International Preliminary Report on Patentability dated Jun. 12, 2018, issued in corresponding International Patent Application No. PCT/US2016/064112.

* cited by examiner

NUCLEAR REACTOR LIQUID METAL COOLANT BACKFLOW CONTROL

BACKGROUND

Field

The present disclosure relates in general to nuclear reactors and in particular to controlling liquid metal coolant circulation through a reactor core of a liquid metal-cooled nuclear reactor.

Description of Related Art

Nuclear reactors included in nuclear plants may be configured to be cooled via heat transfer to one or more coolants circulated through the core. Various coolants may be utilized to remove heat from the reactor core. A coolant may include one or more various substances, including water, liquid metal, molten salt, a gaseous substance, some combination thereof, etc.

In some nuclear plants, a coolant removing heat from a reactor core, also referred to herein as a primary coolant, is circulated through a heat exchanger to transfer the heat to another coolant, also referred to herein as a secondary coolant. In some cases, the secondary coolant is used to perform work, including driving an electrical generator via circulating through a turbine device included in the nuclear plant. In some nuclear plants, a coolant may be used to provide process heat to support one or more industrial processes, including desalination, hydrogen production, etc.

In some cases, a nuclear reactor is configured to be cooled by liquid metal circulation. Such a nuclear reactor is referred to herein interchangeably as a liquid metal-cooled nuclear reactor and may include a primary coolant loop via which one or more liquid metal substances are circulated as the primary coolant. Such one or more liquid metal substances circulating through the primary coolant loop may be circulated at least partially through a reactor core of the nuclear reactor and are referred to herein as liquid metal coolants.

In some cases, a liquid metal coolant that may be circulated through a nuclear reactor includes a conductive liquid metal substance. A liquid metal-cooled nuclear reactor configured to be cooled via a conductive liquid metal substance may include one or more electromagnetic pumps (EMPs) configured to circulate the conductive liquid metal coolant through the nuclear reactor.

SUMMARY

Various embodiments herein relate to apparatuses, systems, and methods associated with a liquid metal-cooled nuclear reactor configured to at least partially mitigate liquid metal coolant backflow through at least a portion of the reactor, in response to an at least partial failure of a primary electromagnetic pump (EMP) configured to circulate liquid metal coolant through the reactor core. The primary EMP is included within the reactor pressure vessel of the nuclear reactor. To at least partially mitigate the liquid metal coolant backflow, the nuclear reactor includes a backflow EMP coupled in series to the primary EMP, and the nuclear reactor is configured to selectively activate the backflow EMP, in response to an at least partial failure of the primary EMP, to at least partially mitigate liquid metal coolant backflow through the primary EMP.

In some embodiments, a nuclear reactor configured to be cooled via liquid metal circulation may include a primary electromagnetic pump (EMP) within a reactor pressure vessel of the nuclear reactor and a backflow EMP within the reactor pressure vessel. The primary EMP may be configured to circulate liquid metal coolant through a reactor core within the reactor pressure vessel. The backflow EMP may be coupled in series with the primary EMP, such that when selectively activated, the backflow EMP at least partially mitigates liquid metal coolant backflow through the primary EMP.

In some embodiments, the backflow EMP may be coupled to the primary EMP, such that the backflow EMP is downstream of the primary EMP and upstream of the reactor core.

In some embodiments, the nuclear reactor may include a plurality of liquid metal coolant return lines coupled to a downstream end of the primary EMP in parallel, and a plurality of backflow EMPs. The plurality of backflow EMPs may be coupled to the plurality of liquid metal coolant return lines, such that the plurality of backflow EMPs are coupled in parallel to the downstream end of the primary EMP. The plurality of backflow EMPs, when selectively activated, may at least partially mitigate liquid metal coolant backflow through the primary EMP.

In some embodiments, the nuclear reactor includes an EMP control system. The EMP control system may be configured to selectively activate the backflow EMP in response to detection of the at least partial failure of the primary EMP.

In some embodiments, the nuclear reactor may include a plurality of primary EMPs and a plurality of sets of backflow EMPs. The plurality of primary EMPs may be to circulate liquid metal coolant in parallel to the reactor core. Each separate set of backflow EMPs may be coupled to a separate primary EMP of the plurality of primary EMPs.

In some embodiments, the primary EMP and the backflow EMP may each be configured to receive power from a separate power supply.

In some embodiments, the backflow EMP may be configured to operate using alternating-current (AC) electrical power.

In some embodiments, the liquid metal coolant comprises at least one of sodium, mercury, lead, bismuth, or tin.

In some embodiments, the backflow EMP may be configured to generate a smaller level of liquid metal coolant flow than the primary EMP.

In some embodiments, the backflow EMP may be configured to generate a smaller pressure head than the primary EMP.

In some embodiments, the backflow EMP may be physically smaller than the primary EMP.

In some embodiments, a method may include configuring a liquid metal-cooled nuclear reactor to at least partially mitigate liquid metal coolant backflow in the nuclear reactor in response to an at least partial failure of a primary electromagnetic pump (EMP) within a reactor pressure vessel of the nuclear reactor. The primary EMP may be configured to circulate liquid metal coolant through at least a reactor core of the nuclear reactor. The configuring may include installing a backflow EMP within the reactor pressure vessel, such that when selectively activated, the backflow EMP at least partially mitigates liquid metal coolant backflow through the primary EMP.

In some embodiments, installing the backflow EMP within the reactor pressure vessel may include coupling the backflow EMP to the primary EMP in series, such that the backflow EMP is positioned downstream of the primary EMP and upstream of the reactor core.

In some embodiments, the nuclear reactor may include a plurality of liquid metal coolant return lines coupled to a downstream end of the primary EMP in parallel. Coupling the backflow EMP to the primary EMP in series may include coupling a plurality of backflow EMPs to the plurality of liquid metal coolant return lines, such that the plurality of backflow EMPs are coupled to the downstream end of the primary EMP in parallel, and the nuclear reactor is configured to at least partially mitigate liquid metal coolant backflow through the primary EMP based on selective activation of the plurality of backflow EMPs.

In some embodiments, the configuring may include communicatively coupling the primary EMP and the backflow EMP to an EMP control system. The EMP control system may be configured to selectively activate the backflow EMP in response to detection of the at least partial failure of the primary EMP.

In some embodiments, the nuclear reactor may include a plurality of primary EMPs. The plurality of primary EMPs may be configured to circulate liquid metal coolant in parallel to the reactor core. The configuring may include installing a plurality of sets of backflow EMPs to separate primary EMPs of the plurality of primary EMPs.

In some embodiments, installing the backflow EMP may include electrically coupling the backflow EMP to a first power supply such that the primary EMP and the backflow EMP are coupled to independent power supplies.

In some embodiments, installing the backflow EMP may include electrically coupling the backflow EMP to an alternating-current (AC) electrical power supply.

In some embodiments, the liquid metal coolant may include at least one of sodium, mercury, lead, bismuth, or tin.

In some embodiments, a method for operating a liquid metal-cooled nuclear reactor may include determining that a primary EMP is at least partially failing to circulate liquid metal coolant to a reactor core of the nuclear reactor, and selectively activating a backflow EMP, in response to the determining, to at least partially mitigate liquid metal coolant backflow through the primary EMP. The primary EMP may be located within a nuclear reactor pressure vessel of the nuclear reactor. The backflow EMP may be coupled in series to the primary EMP. The backflow EMP may be located within the nuclear reactor pressure vessel.

In some embodiments, the backflow EMP may include a plurality of backflow EMPs. The plurality of backflow EMPs may be coupled to the primary EMP in parallel. Selectively activating the backflow EMP may include selectively activating the plurality of backflow EMPs.

In some embodiments, the primary EMP may include a plurality of primary EMPs. The plurality of primary EMPs may be configured to circulate liquid metal coolant in parallel to the reactor core. The backflow EMP may include a plurality of sets of one or more backflow EMPs. Each separate set of one or more backflow EMPs may be coupled to a separate primary EMP of the plurality of primary EMPs. The selectively activating may include activating a selected set of one or more backflow EMPs, in response to determining that a particular primary EMP of the plurality of primary EMPs is at least partially failing to circulate liquid metal coolant, and the selected set of one or more backflow EMPs is coupled to the particular primary EMP.

In some embodiments, determining that the primary EMP is at least partially failing may include detecting a power supply failure associated with the primary EMP.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

DETAILED DESCRIPTION

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It should be understood that, although the terms first, second, third, etc. may be used herein to describe various elements, components, regions, layers and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising,"

when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

Units, systems, and/or devices according to one or more example embodiments may be implemented using one or more instances of hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

The present disclosure relates to a unique liquid metal-cooled nuclear reactor configured to at least partially mitigate liquid metal coolant backflow through at least a portion of the nuclear reactor in response to an at least partial failure of a primary electromagnetic pump (EMP) configured to circulate at least a portion of the liquid metal coolant through the reactor core to remove heat from the core. The nuclear reactor includes a backflow EMP. The backflow EMP is included within the nuclear reactor pressure vessel and is coupled in series with the primary EMP. The nuclear reactor is configured to at least partially mitigate liquid metal coolant backflow through at least a portion of the nuclear reactor based on selective activation of the backflow EMP in response to the at least partial failure of the primary EMP. The backflow EMP may generate pressure resistance to backflow through at least a portion of the reactor, including through the at least partially failed primary EMP. As a result, losses of coolant flow through the reactor as a result of the primary EMP failure may be at least partially mitigated, thereby enabling the nuclear reactor to continue operation with at least one at least partially failed primary EMP and bypassing a necessity to shut down (SCRAM) the reactor core in response to the at least partial failure of the primary EMP.

Figure 1:
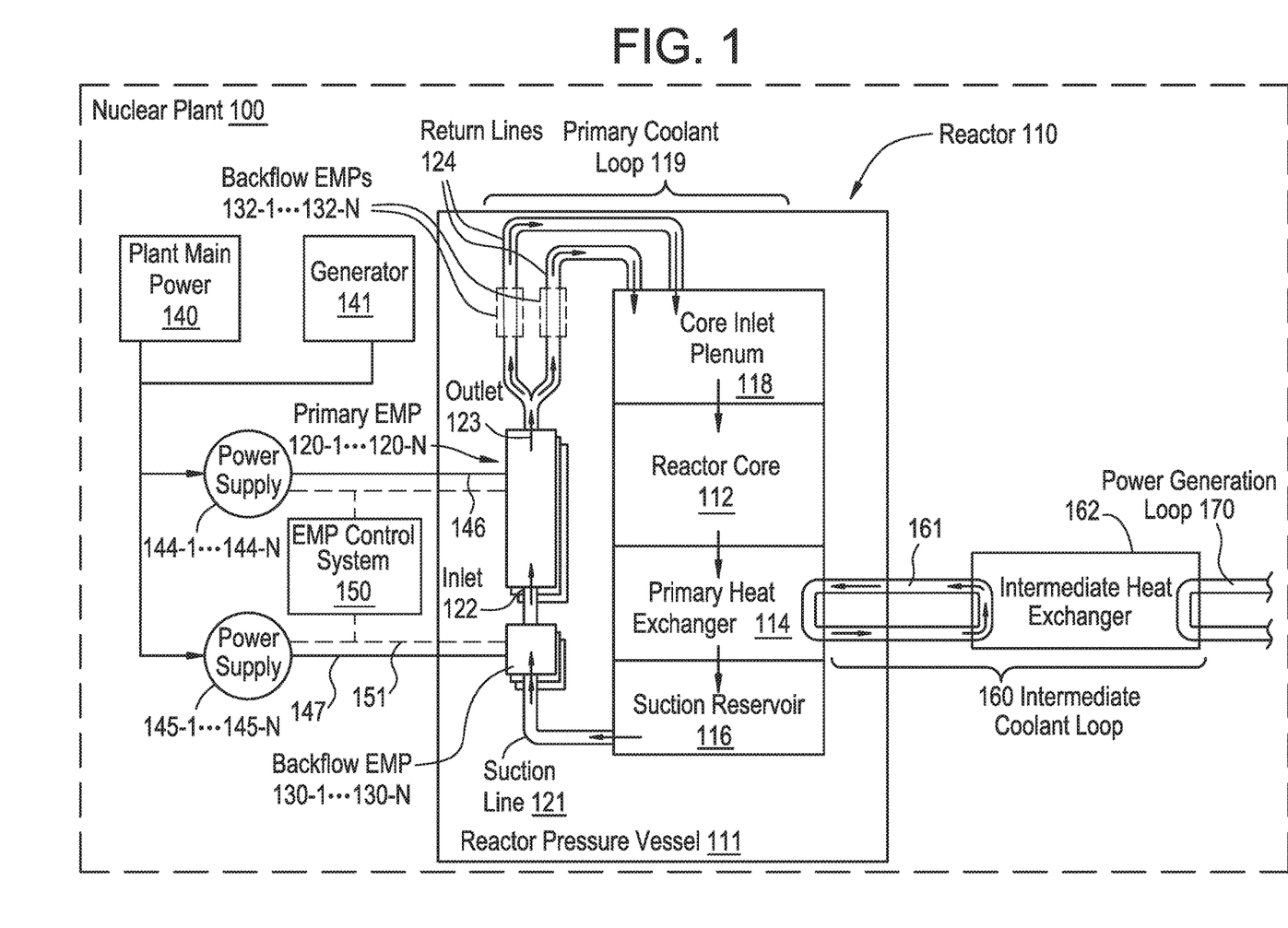
FIG. 1 is a schematic view of a nuclear plant that includes a liquid metal-cooled nuclear reactor, according to some embodiments.

FIG. 1 is a schematic view of a nuclear plant that includes a liquid metal-cooled nuclear reactor, according to some embodiments.

The nuclear plant 100 includes a liquid metal-cooled nuclear reactor (referred to herein as simply a "nuclear reactor") 110, a primary coolant loop 119, an intermediate coolant loop 160, a set of power supplies 144-145, and an EMP control module 150. The primary coolant loop 119 includes at least one set of primary electromagnetic pumps (EMPs) 120-1 to 120-*n* and at least one set of backflow EMPs. The EMP control module 150 is configured to control operation of one or more various sets of EMPs within the nuclear plant 100.

The nuclear reactor 110 includes a nuclear reactor pressure vessel 111. The nuclear reactor pressure vessel 111 includes a nuclear reactor core 112 and multiple components. The multiple components comprise a primary coolant loop 190. The primary coolant loop 190 may be configured to remove heat generated at the core 112 as a result of nuclear reactions within the core 112. The primary coolant loop 190 illustrated in FIG. 1 is configured to circulate a liquid metal coolant through at least a portion of the core 112 to remove, from the core 112, heat generated at the core 112 as a result of nuclear reactions within the core 112. Such heat removal may also be referred to herein as core heat rejection.

As shown, the primary coolant loop 190 includes a primary heat exchanger 114. The primary heat exchanger 114 is configured to transfer heat from the liquid metal coolant exiting the core 112 to another coolant. The other coolant circulates through an intermediate coolant loop 160. The other coolant, in some embodiments, may include a liquid metal coolant. Liquid metal coolants circulating through the primary and intermediate coolant loops may be a common liquid metal substance or different liquid metal substances.

The primary coolant loop 190 includes a suction reservoir 116. The suction reservoir 116 is configured to receive liquid metal coolant that leaves the heat exchanger 114 subsequent to the liquid metal coolant transferring core-generated heat to the intermediate coolant loop 160.

The primary coolant loop 190 includes a set of one or more primary electromagnetic pumps (EMPs) 120-1 to 120-*n*. The primary EMPs 120-1 to 120-*n* are configured to operate in parallel to circulate liquid metal coolant through the nuclear reactor, as shown in FIG. 1. The primary EMPs may be referred to interchangeably herein as "first EMPs," "main EMPs," or "workhorse EMPs." The primary EMPs 120-1 to 120-*n* are each coupled, at an intake orifice 122, to the suction reservoir 115 via a suction line 121. The primary EMPs 120-1 to 120-*n* are also each coupled, at an outlet orifice 123, to a core inlet plenum 118 via one or more return lines 124. Each primary EMP 120-1 to 120-*n* is configured to drive at least a portion of the liquid metal coolant to the plenum and is further configured to generate at least a portion of a pressure head, downstream of the EMPs 120-1 to 120-*n*. The pressure head may provide a driving force to circulate the liquid metal coolant through the core 112 as shown.

In some embodiments, one or more EMPs included in the nuclear plant 100 may include one or more various types of EMPs. For example, an EMP as described herein may include one or more of a conduction EM pump or an induction EM pump. A conduction EMP may be configured to operate using one or more of an alternating-current (AC) electrical power or direct-current (DC) electrical power. An EMP configured to operate using DC electrical power may include one or more of a permanent magnet or an electromagnet. An induction EMP may include one or more of a moving magnet induction pump, a single phase induction pump, or a polyphase induction pump. A polyphase induction pump may include one or more of a linear induction pump, an annular linear induction pump (ALIP), or a helical induction pump. An ALIP may include one or more of a single-stator ALIP or a multi-stator ALIP. A multi-stator ALIP may include a double-stator ALIP.

In some embodiments, the return lines include, for a given EMP 120, a set of multiple return lines 124. The multiple return lines 124 may be coupled in parallel to the outlet orifice 123 of the given EMP 120 and thereby configure the given EMP 120 to drive (pump) liquid metal coolant into the multiple return lines 124 in parallel via the outlet orifice 123 of the given EMP 120.

As shown, nuclear plant 100 includes one or more power supplies 144-1 to 144-n. The one or more power supplies 144-1 to 144-n are each separately electrically coupled to separate primary EMPs 120-1 to 120-n. Each power supply 144 may be configured to supply electrical power to a separate primary EMP 120. Each power supply 144 may include one or more of an AC power supply or a DC power supply. As further shown, the power supplies 144-1 to 144-n are electrically coupled to one or more of a main power supply 140 of the plant 100 or a generator 141. In some embodiments, the plant 100 includes one or more switchgear devices (not illustrated in FIG. 1) configured to selectively supply electrical power, to one or more power supplies 144-145, from one or more of the main power supply 140 or one or more generators 141. A generator 141 may include one or more of a combustion engine, a fuel cell device, a battery, an uninterruptible power supply (UPS), some combination thereof, etc. The plant main power supply 140 may include a power supply configured to supply power generated based on the process fluid circulating through the power generation loop 170.

The nuclear plant 100 includes an intermediate coolant loop 160. The intermediate coolant loop 160 includes a flow of coolant circulating through lines 161 between the primary heat exchanger 114 and an intermediate heat exchanger 162. The intermediate coolant loop 160 may transfer core-rejected heat from the liquid metal coolant circulating through the primary coolant loop 190 to a process fluid circulating through the power generation loop 170 via heat transfer at the intermediate heat exchanger 162. In some embodiments, the coolant circulating through the intermediate coolant loop includes a liquid metal coolant. The liquid metal coolant circulating through the intermediate coolant loop may be similar or different in composition relative to a liquid metal coolant circulating through the primary coolant loop 190.

The plant 100 includes a power generation loop 170 configured to circulate a process fluid that receives heat from the intermediate coolant loop 160 via heat exchanger 162 and performs work, including driving a turbine. The turbine may operate an electrical power generator. The process fluid may include water in one or more various phases. In some embodiments, the power generation loop 170 comprises a steam generator device in which the intermediate heat exchanger 162 is at least partially located, and the heat exchanger 162 is configured to transfer heat from the coolant circulating through the intermediate coolant loop 160 to water located in the steam generator to vaporize the water and generate steam. The generated steam may be used to perform work, including driving a turbine connected to an electrical generator to generate electrical power.

Nuclear plant 100 includes a set of backflow EMPs 130-1 to 130-n. The backflow EMPs 130-1 to 130-n are each coupled in series with a separate primary EMP 120 via the suction line 121. The backflow EMPs may be referred to interchangeably herein as "secondary EMPs," "second EMPs," or "pony EMPs." Each backflow EMP 130 is electrically coupled to a power supply 145. In some embodiments, the set of backflow EMPs 130 are coupled to a common individual power supply 145. One or more power supplies 145 electrically coupled to a backflow EMP 130 may be separate and independent of the one or more power supplies 144 electrically coupled to the primary EMPs 120. As a result, the backflow EMPs 130-1 to 130-n may be configured to receive electrical power from power supplies independently of the power supplies via which the primary EMPs 120-1 to 120-n receive electrical power.

In some embodiments, a backflow EMP coupled in series to a primary EMP (referred to herein as the "corresponding" primary EMP with regard to the backflow EMP) is configured to be selectively activated. A backflow EMP may be selectively activated in response to an at least partial failure of the corresponding primary EMP, so that the backflow EMP generates pressure resistance to liquid metal coolant backflow in a liquid metal coolant line to which the primary EMP is coupled. An at least partial failure of a given primary EMP may include a loss of power to the given primary EMP, a termination of operation of the EMP, a partial loss of pumping capacity at the primary EMP, etc. As a result of the at least partial failure of a primary EMP, a pressure head generated by the given primary EMP may be reduced, terminated, etc.

In some embodiments, a reduction or loss of pressure head generated by a given primary EMP 120 may result in liquid metal coolant backflow through at least a portion of the primary coolant loop 190 in which the primary EMP 120 is included, including liquid metal coolant backflow through the given primary EMP. In some embodiments where a reactor 110 includes multiple primary EMPs 120 configured to operate in parallel to circulate liquid metal coolant through the core 112 via primary coolant loop 190, an at least partial failure of at least one primary EMP 120 may result in backflow through at least a portion of the loop 190 in which the primary EMP 120 is located based at least in part upon a remaining pressure head generated by the remaining operating primary EMPs 120 included in the primary coolant loop 190. The remaining pressure head may generate a driving force. The driving force may drive liquid metal coolant to flow "backwards" through at least the at least partially failed primary EMP 120, as the at least partially failed primary EMP 120 may be unable to generate sufficient pressure head to overcome the remaining pressure head generated by the additional primary EMPs 120.

In some embodiments, a backflow EMP 130 may generate a pressure head. The pressure head provides pressure resistance to liquid metal coolant backflow through at least a portion of the reactor 110, including backflow through the at least partially failure primary EMP 120. The backflow EMP 130 may be selectively activated in response to an at least partial failure of a corresponding primary EMP 120.

In some embodiments, a backflow EMP 130 may be manually activated in response to an at least partial failure of a corresponding primary EMP. In some embodiments, the nuclear reactor 110 is configured to selectively activate at least one given backflow EMP 130 in response to an at least partial failure of a corresponding primary EMP 120. Such selective activation may include activating at least one selected backflow EMP based on determining that at least one particular primary EMP 120 has at least partially failed and further selecting the at least one backflow EMP based on a determination that the at least one backflow EMP is coupled in series with the at least one particular primary EMP (i.e., the at least one backflow EMP is a "corresponding" backflow EMP with regard to the at least one particular primary EMP). Selective activation of backflow EMPs may include activating a limited selection of the backflow EMPs in response to a determination that at least one primary EMP corresponding to the limited selection of backflow EMPs has at least partially failed, so that another limited selection of the backflow EMPs, corresponding to one or more primary EMPs not having failed, are not activated.

In some embodiments, a nuclear reactor includes one or more control systems configured to monitor primary EMP operation and control the selective activation of one or more backflow EMPs in response to at least partial failure of one or more primary EMPs in the nuclear reactor. As shown in FIG. 1, the nuclear reactor 110 may include an EMP control system 150. The EMP control system 150 may be communicatively coupled 151, via one or more communication lines, power transmission lines, etc., to one or more of the power supplies 144, 145, primary EMPs 120-1 to 120-$n$, backflow EMPs 130-1 to 130-$n$, some combination thereof, etc. The EMP control system 150 may, in some embodiments, be coupled to one or more sensor devices (not shown in FIG. 1) configured to generate senor data associated with one or more of the power supplies 144-145, EMPs 120, 130, etc.

The EMP control system 150 may monitor the operation of one or more of the primary EMPs 120, based on monitoring information associated with one or more of the power supplies 144-145, primary EMPs 120, etc. For example, the EMP control system 150 may receive sensor data generated by one or more sensor devices. The sensor data may include information indicating a flow of electrical power from a given power supply 144 to a given primary EMP 120. In another example, the EMP control system may receive sensor data generated by one or more sensor devices. The sensor data may include information indicating a strength of a magnetic field generated by one or more portions of a given primary EMP 120.

The EMP control system 150 may be configured to determine, based on processing one or more instances of information received at the system 150, whether one or more primary EMPs 120 are at least partially failed. For example, the EMP control system 150 may determine that a primary EMP 120 is at least partially failed in response to a determination that power supplied to the primary EMP 120 is less than a threshold amount of power. In another example, the EMP control system 150 may determine that a primary EMP 120 is at least partially failed in response to a determination that power supplied to the primary EMP 120 is lost. In another example, the EMP control system 150 may determine that a primary EMP 120 is at least partially failed in response to a determination that a strength of a magnetic field generated in association with the primary EMP 120 is less than a threshold level of field strength. In response to determining that a given primary EMP 1.20 is at least partially failed, the control system 150 may be configured to selectively activate one or more backflow EMPs 130, 132 corresponding to the at least partially failed primary EMP 120. The control system may further deactivate the at least partially failed primary EMP 120, generate a warning signal. The warning signal is transmitted to a terminal supporting an operator, etc. Activating or deactivating a primary EMP, backflow EMP, etc. may include controlling a supply of electrical power to the primary EMP, backflow EMP, etc. from a corresponding power supply. For example, a power supply 144, 145 may include a switch device configured to selectively control the supply of electrical power from the respective power supply to a corresponding ("electrically coupled") EMP, and the EMP control system 150 may be one or more special purpose machines configured to control the switch device of the corresponding power supply by executing code stored on a memory.

The EMP control system 150, in some embodiments, includes one or more computer systems. A computer system may include one or more instances of circuitry. The one or more instances of circuitry may include one or more processor devices ("processors") coupled to one or more instances of memory. The one or more processors may include one or more central processor units (CPUs). The one or more processors may be configured to implement the EMP control system.

In some embodiments, a backflow EMP may be located at one or more various locations within the primary coolant loop 190. For example, in some embodiments, a primary coolant loop 190 includes a set of multiple return lines 124 and a set of multiple backflow EMPs 132 coupled to separate return lines 124. The return lines 124 may be coupled in parallel to an outlet orifice 123 of a primary EMP 120, at a downstream end of the EMP 120. The set of multiple backflow EMPs 132 may thus be coupled in parallel to the downstream end of the primary EMP 120. In some embodiments, a nuclear reactor 110 includes a set of multiple backflow EMPs 132 coupled in parallel to a set of return lines 124, in addition or in alternative to the illustrated backflow EMPs 130 coupled in series to upstream ends of respective primary EMPs 120. In some embodiments, a nuclear reactor 110 includes separate backflow EMPs 132. The separate backflow EMPs 132 are each separately coupled, in series, to separate primary EMPs 120 on respective downstream sides of the respective primary EMPs 120.

In some embodiments, a backflow EMP provides at least partial mitigation of liquid metal coolant in the nuclear reactor. The backflow EMP may be selectively activated in response to at least partial failure of a corresponding primary EMP. As a result, a reduction of liquid metal coolant circulation which may result from backflow caused by the at least partial failure of the primary EMP may be at least partially mitigated. Mitigating liquid metal coolant circulation reduction resulting from a primary EMP at least partial failure may result in mitigating core heat rejection reduction resulting from a primary EMP at least partial failure. As a result, because core heat rejection reduction may be at least partially mitigated as a result of the selective activation of the backflow EMP, the reactor 110 may remain operational subsequent to the at least partial primary EMP failure, even if at a reduced power (heat generation) level. As a result, a need to at least partially shut down the reactor 110 in response to reduced core heat rejection in response to an at least partial failure of a primary EMP 120 may be at least partially mitigated, thereby mitigating reactor operation interruptions and streamlining reactor operations.

Furthermore, because the reactor 110 may continue operating subsequent to the at least partial primary EMP 120 failed, a shutdown of the reactor 110 to enable immediate maintenance operations to restore the failed EMP 120 may be rendered unnecessary, and the reactor 110 may continue to be operated until a previously-scheduled maintenance session, during which time the failed primary EMP 120 may then be restored. As a result, reactor operation interruptions may be further mitigated, thereby streamlining reactor operations.

In some embodiments, a backflow EMP 130, 132 included in a nuclear reactor 110 is smaller than a corresponding primary EMP 120 to which the backflow EMP is coupled. An EMP smaller than another EMP may be physically smaller in occupied volume, smaller in mass, smaller with respect to pressure head generation capacity, smaller with respect to liquid metal coolant flowrate generation capacity, some combination thereof, etc. For example, a backflow EMP 130, 132 may be one-half as massive as a corresponding primary EMP 120.

In some embodiments, at least one of a backflow EMP 130, 132 and a corresponding primary EMP 120 are located within a common reactor pressure vessel 11. At least one of a backflow EMP 130, 132 may be configured to occupy otherwise unused space within the pressure vessel 111, so that backflow mitigation is provided without substantial alteration to the flow path of the liquid metal coolant or the size of the reactor pressure vessel. As a result, the footprint of the pressure vessel 111 may be substantially unaltered by the installation of one or more backflow EMPs within the pressure vessel 132.

In some embodiments, while one or more of the backflow EMPs may be smaller than the corresponding primary EMPs to which the backflow EMPs are coupled and thus not configured to provide full redundancy to the corresponding primary EMPs, the backflow EMPs, as a result of fitting into available unused space within the pressure vessel and at least partially mitigating liquid metal coolant backflow in response to at least partial primary EMP failures, may provide a balance of reactor operation streamlining (via mitigating a necessity to immediately shut down the reactor in response to a primary EMP failure) and capital expenditures (via mitigating a necessity to implement alterations to the foot print of the reactor pressure vessel 111 and thereby mitigating capital expenditures required to support the backflow mitigation feature).

In some embodiments, the intermediate coolant loop 160 includes one or more of the primary EMPs 120, at least one of backflow EMPs 130, 132, etc. which are illustrated to be included in the primary coolant loop 190. A set of one or more primary EMPs and one or more backflow EMPs included in the intermediate loop may be configured to operate similarly to the EMPs 120, 130, 132 included in the primary coolant pump 190. A set of one or more primary EMPs and one or more backflow EMPs included in the intermediate loop may be located external to the reactor pressure vessel 111.

As referred to herein, the liquid metal coolant may include one or more various liquid metal substances, including one or more of sodium, mercury, lead, bismuth, or tin. The one or more liquid metal substances may be conductive metal substances, such that an EMP is configured circulate the liquid metal coolant.

Figure 2:
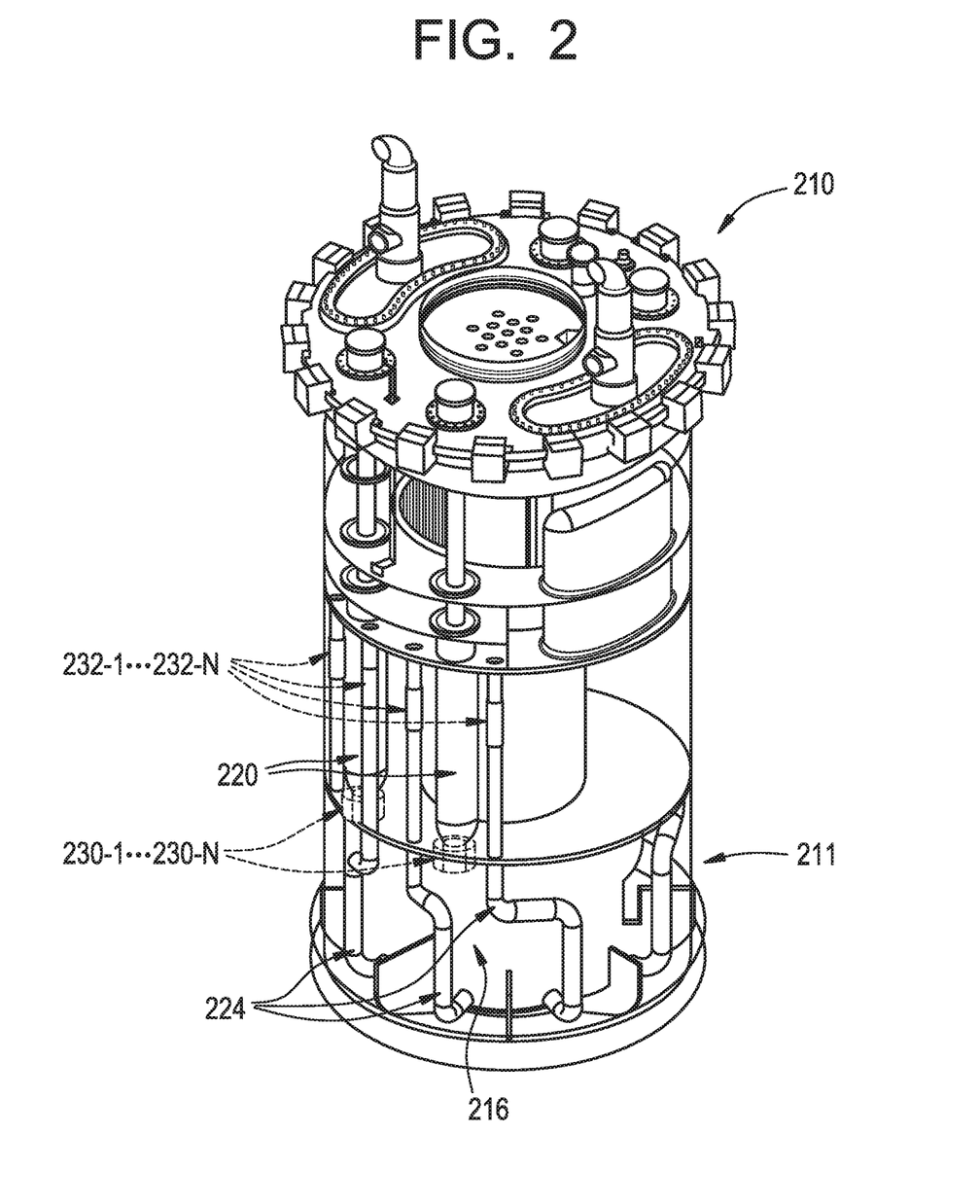
FIG. 2 is a perspective view of a liquid metal-cooled nuclear reactor, according to some embodiments.

FIG. 2 is a perspective view of a liquid metal-cooled nuclear reactor, according to some embodiments. The nuclear reactor illustrated in FOG. 2 may be included in any of the embodiments of nuclear reactors included herein, including the reactor 110 shown in FIG. 1.

In some embodiments, a nuclear reactor includes a pressure vessel. Both the primary EMPs and the backflow EMPs may be included in the pressure vessel. As shown in FIG. 2, a nuclear reactor 210 may include a pressure vessel 211 and may further include, within the pressure vessel 211, a set of multiple primary EMPs 220 and a set of backflow EMPs 230. The backflow EMPs 230 are each coupled to separate primary EMPs 220. As shown, the reactor 210 includes a set of backflow EMPs 230 which are each coupled in series to an inlet orifice of a separate primary EMP 220 on an upstream end of the respective primary EMP 220, so that liquid metal coolant circulated from a suction reservoir 216 included in the reactor 210 first passes through at last one backflow EMP 230 prior to passing through a coupled primary EMP 220. As shown, the backflow EMPs 230 may be coupled to the inlets of respective primary EMPs 220 without substantially altering the flow path of the liquid metal coolant, without substantially altering the configuration, position, operation, etc. of one or more of the components included in the reactor 210, some combination thereof, etc.

In some embodiments, the reactor 210 includes multiple sets of backflow EMPs 232, where each set of backflow EMPs includes multiple backflow EMPs 232. The backflow EMPs 232 are coupled, in parallel with each other, to an outlet orifice of a separate primary EMP 220 on a downstream end of the respective primary EMP 220 via coupling the backflow EMPs 232 in series with separate parallel return lines. The separate parallel return lines are themselves coupled in parallel with the outlet orifice of the primary EMP 220. As shown, the backflow EMPs 232 may occupy available unoccupied space (volume) in the reactor pressure vessel interior and may not substantially alter the flow path of liquid metal coolant. As a result, capital expenditures associated with configuring a nuclear reactor to at least partially mitigate liquid coolant backflow as a result of at least partial failure of at least one primary EMP 220 may be at least partially reduced or minimized.

Figure 3:
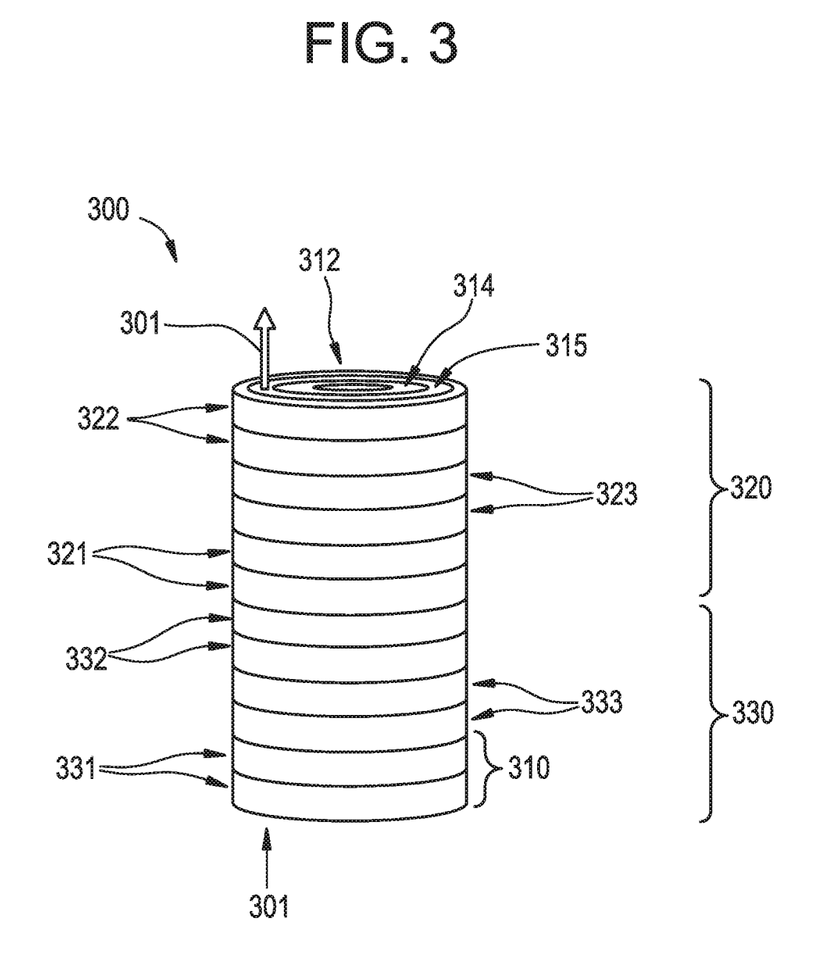
FIG. 3 is a perspective view of an electromagnetic pump, according to some embodiments.

FIG. 3 is a perspective view of an electromagnetic pump, (EMP) according to some embodiments. The EMP shown in FIG. 3 may be included in any of the EMPs included herein, including the backflow EMPs 130, 132 illustrated in FIG. 1.

In some embodiments, an EMP included in a nuclear reactor includes an annular linear induction pump (ALIP) configured to drive liquid metal coolant. The ALIP may include a double stator ALIP. FIG. 3 illustrates an EMP 300 which includes a double stator ALIP.

As shown, the double stator ALIP may include multiple "slots" 310. The slots 310 are coupled together to comprise the ALIP. An ALIP may include various quantities of slots. The illustrated embodiment of an ALIP 300, for example, includes 12 slots. Each "slot" may include a portion of an inner stator 314 and a portion of an outer stator 312. One or more of the stator portions included in a given slot may include at least one coil. The at least one coil extends circumferentially through the respective stator portion and is surrounded by a laminated iron core. Each coil may include one or more wound pancake coils. Each coil in a stator portion may be configured to carry a circumferential current through the respective stator portion, and the current may energize the coil and result in a generation of an induced magnetic field in the laminated iron core.

As shown, the ALIP 300 may include a flow annulus 315 which extends through the ALIP 300 between the inner stator 314 and the outer stator 312. The induced magnetic field in a laminated iron core of the various slots 310 included in the ALIP 300 may result in a magnetic field. The magnetic field may extend through the flow annulus. The magnetic field may induce a current on a liquid metal coolant located in the flow annulus 315. The induced current may result in inducing flow of the liquid metal coolant through the flow annulus. As a result, the ALIP 300 may drive a liquid metal coolant through the flow annulus 315 independently of any mechanically moving parts in the ALIP 300.

As shown, the ALIP includes multiple slots 310. The slots 310 are coupled together. The slots are coupled to form separate poles 320, 330, where each pole 320, 330 comprises three sets of slots 321, 322, 323 and 331, 332, 333. Each set of slots may be configured to use a separate phase of a three-phase electrical power received at the ALIP 300 from a power source.

In some embodiments, a primary EMP included in a nuclear reactor includes an ALIP and a backflow EMP included in a nuclear reactor includes an ALIP which is smaller than the primary EMP. For example, in some embodiments, the backflow EMP includes an ALIP which comprises half as many slots as an ALIP included in the primary EMP. As a result, the backflow EMP may occupy approximately half of a physical volume, relative to a physical volume ("space") occupied by the primary EMP. IN addition, such a backflow EMP may be configured to generate approximately half of a pressure head, liquid metal coolant flow rate, some combination thereof, etc. relative to the primary EMP.

Figure 4:
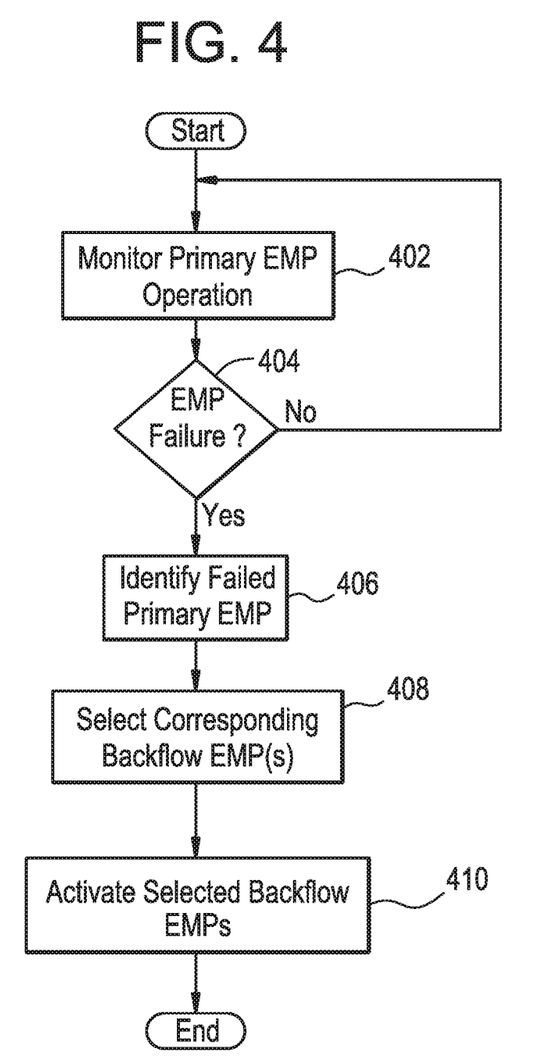
FIG. 4 illustrates at least partially mitigating liquid metal coolant backflow in a nuclear reactor, according to some embodiments.

FIG. 4 illustrates at least partially mitigating liquid metal coolant backflow in a nuclear reactor, according to some embodiments. The at least partial mitigation may be implemented with regard to any of the embodiments included herein. In some embodiments, the at least partial mitigation is at least partially implemented by an EMP control system included in a nuclear reactor, where the EMP control system is implemented by one or more computer systems.

At 402, the EMP control system monitors an operation of one or more primary EMPs in a nuclear reactor. The monitoring may include one or more of monitoring one or more parameters of electrical power supplied to the one or more primary EMPs, monitoring one or more power supplies supplying electrical power to the one or more primary EMPs, monitoring a flowrate of liquid metal coolant through the one or more primary EMPs, monitoring a pressure difference across the one or more primary EMPs, monitoring a magnetic field generated by one or more portions of one or more primary EMPs, etc. The monitoring may be based on processing received sensor data, where the sensor data may be generated by one or more sensor devices included in the nuclear reactor.

At 404, EMP control system determines whether a primary EMP is at least partially failed. If not, the monitoring 402 continues. An at least partially failed primary EMP may be referred to herein as a failed primary EMP.

The determination at 404 may include determining whether one or more monitored parameters associated with a primary EMP at least meets one or more threshold values. For example, the determination may include a determination of whether or one or more of electrical power supplied to the primary EMP, field strength of a magnetic field generated at the primary EMP, flowrate through the primary EMP, pressure difference across the primary EMP, some combination thereof, etc. has crossed one or more respective threshold values. In some embodiments, the determination may include a determination of whether or not one or more parameters associated with a given primary EMP diverges by at least a threshold amount from one or more corresponding parameters associated with at least one other primary EMP in the nuclear reactor.

At 406, in response to a determination at 404 that at least one primary EMP is at least partially filed, the EMP control system identifies the failed primary EMP. Identification may include identifying a specific component code associated with the failed primary EMP.

At 408, the EMP control system identifies and selects one or more backflow EMPs corresponding to the failed primary EMP. Selection may be based on referencing a set of associations between primary EMPs and corresponding backflow EMPs, where the selection includes identifying an association and further identifying the corresponding backflow EMPs using the identified association. The identified association includes the failed primary EMP. The set of associations may be stored in a database and the selection may include referencing said database. In some embodiments, the selection of a set of one or more corresponding backflow EMPs is implemented via a hardwired electrical connection between one or more monitoring circuits associated with the primary EMP, where the one or more monitoring circuits are configured to implement at least the determination at 404, and one or more selection circuits associated with the corresponding set of one or more backflow EMPs, where the one or more selection circuits are configured to implement at least the selection at 408.

At 410, in response to selection of a particular set of one or more backflow EMPs, the EMP control system activates the selected one or more backflow EMPs. In some embodiments, the activation of the selected backflow EMPs at 410 includes selective deactivation of the identified failed primary EMP corresponding to the selected backflow EMPs. Activation or deactivation of a given EMP may include generating a control signal. The control signal is communicated to a component in the nuclear reactor and causes the component to control the given EMP. For example, activating an EMP may include generating an activation control signal. The activation control signal is communicated to a power supply and causes one or more portions of the power supply to initiate a supply of electrical power to the EMP, thereby resulting in the EMP being activated. In another example, deactivating an EMP may include generating a deactivation control signal. The deactivation control signal is communicated to a power supply and causes one or more portions of the power supply to terminate a supply of electrical power to the EMP, thereby resulting in the EMP being deactivated. In some embodiments, the control signal causes a component included in the nuclear reactor to switch to an alternate configuration, such that sequential transmission of the control signal results in the component sequentially alternating between activating and deactivating an EMP. The component, in some embodiments, includes an electrical switching device, also referred to herein as including a switch gear device, switch device, etc.

The above-described circuits may be included, in part or in full, within one or more EMP control systems included in a nuclear reactor.

Figure 5:
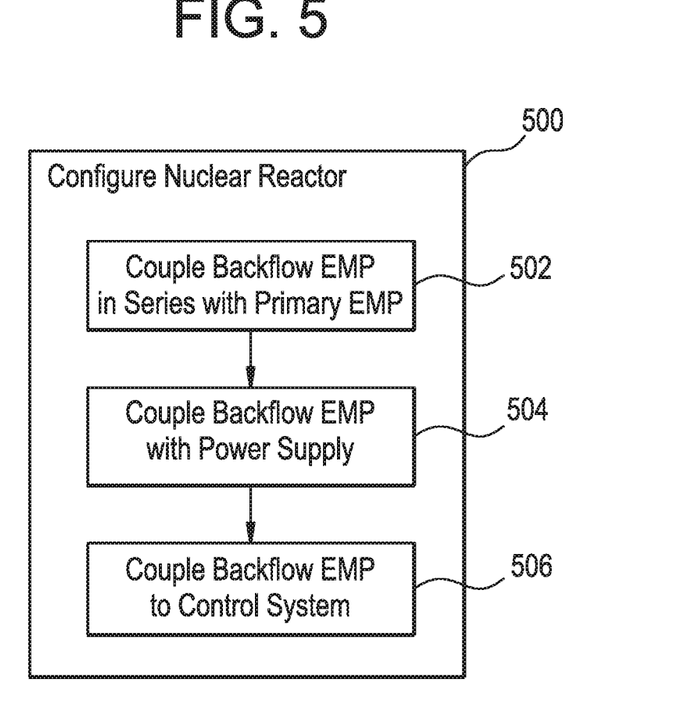
FIG. 5 illustrates configuring a nuclear reactor to at least partially mitigating liquid metal coolant backflow in a nuclear reactor, according to some embodiments.

FIG. 5 illustrates configuring 500 a nuclear reactor to at least partially mitigating liquid metal coolant backflow in a nuclear reactor, according to some embodiments. The configuring may be implemented with regard to any embodiment of nuclear reactors included herein, including the nuclear reactor 110 illustrated in FIG. 1.

At 502, the configuring 500 may include coupling a backflow EMP in series with a primary EMP in a nuclear reactor. The coupling may be implemented by a human operator. The primary EMP may be included within a pressure vessel of the nuclear reactor, and the coupling may result in the backflow EMP being included within the pressure vessel. The coupling may include coupling the backflow EMP to either an inlet orifice or and outlet orifice of the primary EMP and may include coupling the backflow EMP to the primary EMP via one or more instances of liquid metal coolant lines. Such lines may include one or more of a return line or a suction line. In some embodiments, the coupling includes coupling multiple backflow EMPs in parallel with each other to an orifice of the primary EMP via coupling the separate backflow EMPs to separate liquid metal coolant lines. The separate liquid metal coolant lines extend in parallel from the orifice. The coupling may include coupling the backflow EMP to a primary EMP within a prefabricated nuclear reactor pressure vessel, so that the backflow EMP, when coupled to the primary EMP, occupies previously unused space within the prefabricated nuclear reactor pressure vessel.

At 504, the configuring 500 may include electrically coupling the backflow EMP to a power supply. The electrically coupling may be implemented by a human operator. The power supply may be separate from a power supply to which the primary EMP is electrically coupled.

At 506, the configuring 500 may include coupling the backflow EMP to one or more EMP control systems. The coupling may be implemented by a human operator. The coupling may include communicatively coupling the backflow EMP to one or more portions of the EMP control system via one or more communication lines, electrically coupling the backflow EMP to one or more portions of the EMP control system via one or more power lines, coupling the power supply to which the backflow EMP is coupled to the EMP control system via one or more communication lines, power lines, etc.

The following is a summary of the various features and advantages of a liquid metal-cooled nuclear reactor configured to at least partially mitigate liquid metal coolant backflow through at least a portion of the reactor, although it should be understood that the following is not an exhaustive list.

The nuclear reactor may include a primary EMP configured to circulate liquid metal coolant through the reactor in a primary coolant loop. The nuclear reactor may further include a backflow EMP which is coupled in series with the primary EMP. Both the primary EMP and the backflow EMP may be included within a pressure vessel of the nuclear reactor. The EMP may provide a reliability benefit to nuclear reactor operations, based on a lack of mechanically moving parts in an EMP. In addition, a nuclear reactor which includes the first and backflow EMPs may lack valves in the pumping circuit. A lack of valves in the pumping circuit may provide a safety feature in that the EMPs provide a natural circulation pathway for reactor shutdown and emergency core cooling.

A liquid metal-cooled nuclear reactor configured to at least partially mitigate liquid metal coolant backflow through at least a portion of the nuclear reactor in response to an at least partial failure of at least one primary EMP, based on selective activation of a backflow EMP, may be configured to enable increased flexibility in nuclear reactor operations for grid load following, maintenance and loss of an EMP until the next refueling interval. The selectively activated backflow EMP may result in reduced safety challenges to a reactor protection system of the nuclear reactor. The reactor protection system of the nuclear reactor may at least partially shut down the nuclear reactor (SCRAM) in response to an at least partial failure of at least one primary EMP in the reactor.

In addition, the inclusion of the backflow EMP within the pressure vessel of the nuclear reactor provides space-saving benefits by mitigating alterations to the coolant flow path to accommodate backflow mitigation and mitigating effects of the alterations to reactor size and nuclear plant space constraints.

A nuclear reactor which includes the backflow EMP may be configured to avoid the necessity of nuclear reactor shutdown in response to the at least partial failure of the at least one primary EMP. Where a nuclear reactor includes multiple primary EMPs, the selectively activated backflow EMP may generate pressure resistance against backflow within the portion of the coolant loop which includes the primary EMP without significant alteration to the flow profile. As a result, the nuclear reactor may be configured to operate, at least in a reduced operating state, with at least one failed primary EMP for an extended period of time, thereby bypassing a necessity to at least partially shut down the reactor to restore the failed primary EMP to full operation. For example, full restoration of the failed primary EMP may be delayed until a subsequent scheduled maintenance period, rather than requiring immediate action and at least partial shutdown of the nuclear reactor. As a result, nuclear plant interruptions may be at least partially mitigated, resulting in a streamlining of nuclear plant operations. Where the nuclear reactor is included in an electrical generation nuclear plant, the nuclear reactor configured to at least partially mitigate liquid metal coolant backflow may at least partially mitigate reductions in electrical power output of the nuclear plan which may result from at least partial failure of a primary EMP included in the primary coolant loop.

In some embodiments, an intermediate coolant loop in the nuclear plan may include a serially coupled primary EMP and backflow EMP, where the backflow EMP may be selectively activated in response to an at least partial failure of the primary EMP in the intermediate coolant loop. Such an intermediate coolant loop may be configured to at least partially mitigate reduction of the heat transfer flow paths for heat to be transferred from the primary coolant loop to the intermediate coolant loop to a process fluid. The process fluid may include water. Where the nuclear reactor is included in an electrical generation nuclear plant, an intermediate coolant loop configured to at least partially mitigate liquid metal coolant backflow may at least partially mitigate reductions in electrical power output of the nuclear plant, where the reductions result from at least partial reduction of steam production resulting from a failure of a primary EMP included in the intermediate coolant loop.

As a result of being configured to at least partially mitigate liquid metal coolant backflow through at least a portion of the nuclear reactor based on selective activation of a backflow EMP in response to an at least partial failure of a serially-coupled primary EMP, an operational reliability of the nuclear reactor may be improved, based at least in part upon the nuclear reactor being configured to continue operating during a defect condition which includes at least one primary EMP being at least partially failed. Such an operational reliability improvement may result in an increase in a capacity factor of electricity generation for a nuclear electrical power generation plant in which the nuclear reactor is included.

While a number of example embodiments have been disclosed herein, it should be understood that other variations may be possible. Such variations are not to be regarded as a departure from the spirit and scope of the present disclosure, and all such modifications as would be obvious to one skilled in the art are intended to be included within the scope of the following claims. In addition, while processes have been disclosed herein, it should be understood that the described elements of the processes may be implemented in different orders, using different selections of elements, some combination thereof, etc. For example, some embodiments of the disclosed processes may be implemented using fewer elements than that of the illustrated and described processes, and some embodiments of the disclosed processes may be implemented using more elements than that of the illustrated and described processes.

The invention claimed is:

1. A nuclear reactor configured to be cooled via liquid metal circulation, the nuclear reactor comprising:
   a primary electromagnetic pump (EMP) within a reactor pressure vessel of the nuclear reactor, the primary EMP configured to circulate liquid metal coolant through a primary coolant flow path that includes a reactor core in the reactor pressure vessel; and
   a backflow EMP within the reactor pressure vessel, the backflow EMP coupled in series with the primary EMP within the primary coolant flow path, the backflow EMP being configured to be activated to at least partially mitigate backflow through the primary EMP and the primary coolant flow path in response to an at least partial failure of the primary EMP.

2. The nuclear reactor of claim 1, wherein the backflow EMP is coupled to the primary EMP such that the backflow EMP is downstream of the primary EMP and upstream of the reactor core.

3. The nuclear reactor of claim 2, further comprising:
   a plurality of liquid metal coolant return lines coupled to a downstream end of the primary EMP in parallel; and
   a plurality of backflow EMPs, the plurality of backflow EMPs are coupled to the plurality of liquid metal coolant return lines, such that the plurality of backflow EMPs are coupled in parallel to the downstream end of the primary EMP, and the plurality of backflow EMPs are configured to at least partially mitigate liquid metal coolant backflow through the primary EMP.

4. The nuclear reactor of claim 1, further comprising:
   an EMP control system configured to detect the at least partial failure of the primary EMP, and automatically activate the backflow EMP in response to the detection of the at least partial failure of the primary EMP.

5. The nuclear reactor of claim 1, further comprising:
   a plurality of primary EMPs, the plurality of primary EMPs configured to circulate liquid metal coolant in parallel to the reactor core; and
   a plurality of sets of backflow EMPs, each separate set of backflow EMPs being coupled to a separate primary EMP of the plurality of primary EMPs.

6. The nuclear reactor of claim 1, wherein the primary EMP and the backflow EMP are each configured to receive power from a separate power supply.

7. The nuclear reactor of claim 1, wherein the backflow EMP is configured to operate using alternating-current (AC) electrical power.

8. The nuclear reactor of claim 1, wherein the liquid metal coolant includes at least one of sodium, mercury, lead, bismuth, or tin.

9. The nuclear reactor of claim 1, wherein the backflow EMP is configured to generate a smaller level of liquid metal coolant flow than the primary EMP.

* * * * *